Oct. 2, 1928.

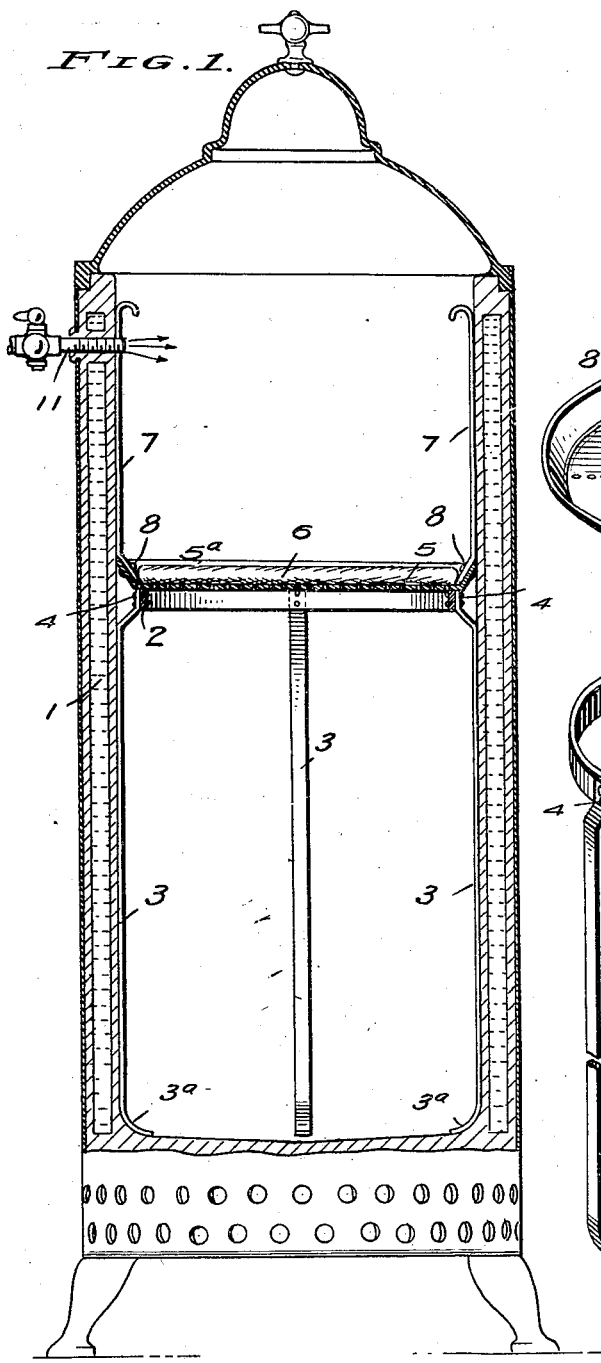
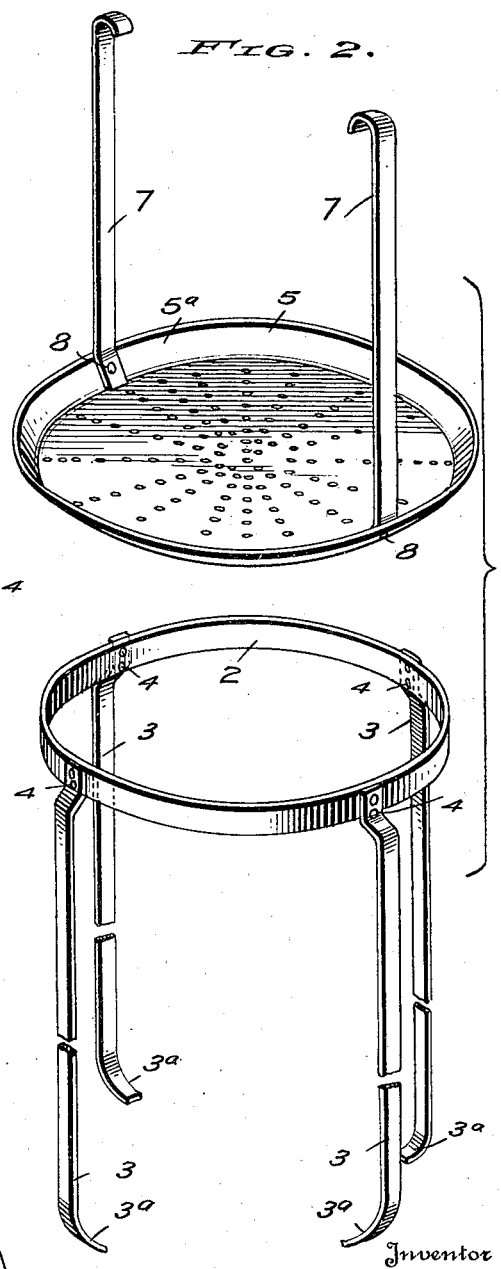

K. LEVI 1,686,283

COFFEE URN

Filed Dec. 23, 1927   2 Sheets-Sheet 2

Inventor
Karl Levi

By Milo B. Stevens & Co.
His Attorneys

Patented Oct. 2, 1928.

1,686,283

UNITED STATES PATENT OFFICE.

KARL LEVI, OF MINNEAPOLIS, MINNESOTA.

COFFEE URN.

Application filed December 23, 1927. Serial No. 242,189.

My invention relates to improvements in coffee urns such as are used in hotels, restaurants, etc,—and also to a novel and improved method of brewing coffee therein,—it being understood that the term "urn" is used in its generic sense and that the invention may be practiced with the household coffee pot.

Up to the present time, the usual method of brewing coffee in hotels and restaurants is to place a course or medium ground coffee in a bag suspended from the top of the pot or urn. A given quantity of boiling water is poured over the coffee and after about fifteen minutes the contents of the urn is repoured over the coffee from to to four times in order to extract as much as possible of the strength from the grounds. Owing to the tendency of the ground coffee to pack tightly in the bag,—especially at the center,—it is not feasible to use pulverized coffee. Thus,—considerable time is lost in getting a brew of the desired strength owing to the necessity of repouring as aforesaid. Furthermore,—much of the nutritive qualities of the brew, the original flavor, volatile oil, are lost as a result of the continuous steaming which is incidental to the extended boiling period in present day coffee brewing.

It is therefore the primary object of my invention to overcome the aforenoted objections and to provide a novel method and apparatus whereby pulverized coffee may be used in lieu of coarse ground,—to the end that all desirable properties of the coffee may be gotten therefrom in one pouring,—the brew derived being of full strength, aroma, flavor and stimulating characteristics, and perfectly filtered.

A further object of the invention is to effect, through the method and apparatus to be hereinafter described,—a greater saving in coffee than has heretofore been possible.

The foregoing and other objects of the invention are attained by means of a novel arrangement of parts to be hereinafter described and claimed, and in order that the same may be better understood, reference is had to the accompanying drawings forming a part of this specification. It is to be understood, however, that various changes and modifications may be made without departing from the spirit and scope of the subject matter claimed.

In the drawings, wherein the same reference characters have been used to designate the same parts in all views,—

Figure 1 is a longitudinal sectional view through an urn, and illustrating the application of my invention thereto;

Figure 2 is a group perspective view of certain of the parts disassembled;

Figure 3:
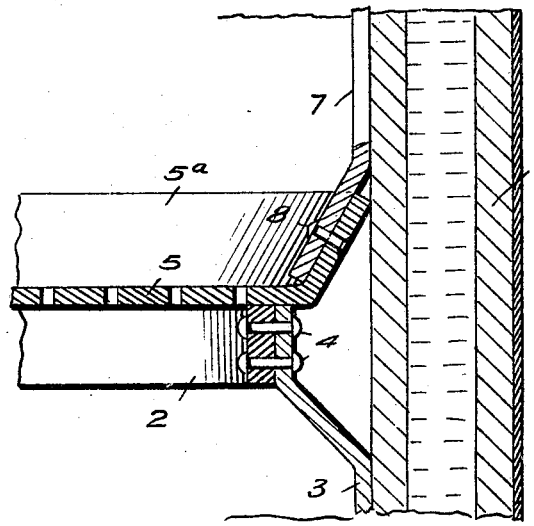
Figure 3 is a detailed sectional view on enlarged scale and showing a portion of the stand and perforated plate assembly.
Figure 4:
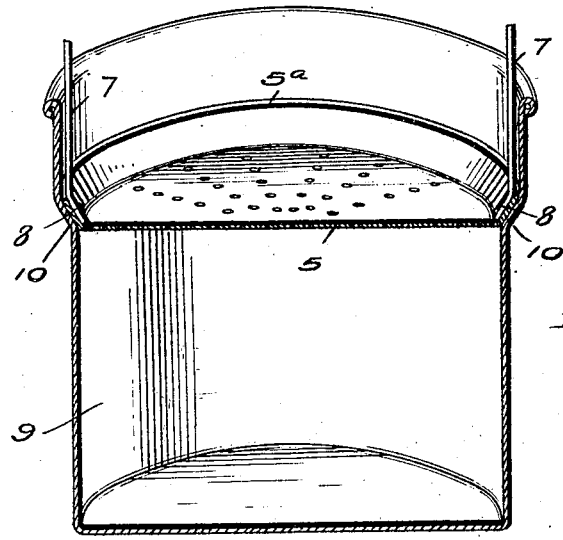
Figure 4 is a perspective view, partly broken, and partly in section showing an auxiliary vessel employed in carrying out the invention,—and showing associated therewith the perforated plate.
Figure 5:
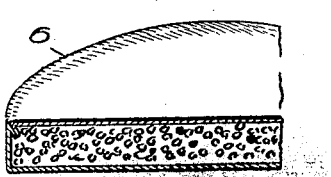
Figure 5 is a fragmentary perspective view,—partly broken and partly in section of the coffee bag.

Referring specifically to the drawings, numeral 1 denotes a coffee urn of the type commonly used in restaurants, hotels and the like. Supported in the urn 1 is a stand which comprehends a ring or annulus 2 having depending legs 3 which flatly engage the side of the urn chamber and are supported by the bottom thereof. The legs 3 are preferably riveted to the outer surface of ring 2 as at 4,—and their lower ends are curved inwardly as at 3ᵃ to conform to the wall curve adjacent the bottom of the urn chamber.

The ring or annulus 2 is relatively smaller in diameter than the urn chamber and is spaced from the wall thereof as shown, so as to define a support for the perforated plate 5,—which latter acts as a rest for a coffee bag 6. The outwardly flaring upstanding flange 5ᵃ of the plate 5 has a three-fold function. First,—it serves to confine the bag 6 in a "pan-cake-like" form so that it will be spread over the entire area of the perforated plate 5. Secondly,—flange 5ᵃ acts as a seal to engage the urn chamber wall and prevent water from passing around the edges of the perforated plate 5. Thirdly,—flange 5ᵃ defines an attaching portion for the upstanding lifting handles 7 which are riveted or otherwise fastened to the inner surface thereof as indicated at 8. Handles 7 have hooked ends so that they may be conveniently grasped when inserting or removing the perforated plate 5.

In carrying out the invention, there is further employed a vessel 9 which is shaped like the lower half of a double boiler,—there being provided a shoulder 10 designed to support the perforated plate 5 at a certain stage of the process or method, as will be hereinafter more fully described.

The urn 1 has an inlet spout 11 for discharging hot water into the urn chamber and upon the bag 6 on the perforated plate 5. Inasmuch as the urn, per se, forms no part of the present invention it has not been described in detail.

The various elements of my invention,—that is to say, the perforated plate 5, ring 2, etc.,—are preferably made of aluminum or enameled ware although other materials may be used with good results.

In practicing the invention,—the stand 2, 3 is inserted in the urn chamber, whereupon the perforated plate 5 is inserted to rest upon the ring 2 and the coffee bag deposited upon the plate 5. It is to be noted that the bag 6 is only partially filled so that it may be spread over the whole area of the plate 5 whereby the layer of finely ground coffee will be relatively thin and of uniform thickness at all points. The apertures of the plate 5 are relatively small so as to retard the flow of coffee solution therethrough to a considerable extent. This makes it possible to secure a complete extraction of the desired properties from the coffee with but one pouring through the plate 5 and bag 6,—and of course it is to be understood that the pulverized character of the coffee in bag 6, and the thin-layer distribution of the coffee over the entire area of the plate 5 are very important contributing factors to this end.

As heretofore intimated, the boiling water, two-thirds of intended quantity, is introduced into the urn chamber through the spout 11. The sheer weight of the water upon the bag 6 on plate 5 will overcome the resisting power of the pulverized mass of coffee,—the small perforations of the plate 5 retarding the downward flow sufficiently to permit full extraction of the desirable portion of the coffee, as aforesaid.

After a comparatively short time, the major part of the water will have passed through the coffee. While the level of the liquid in the urn chamber is still below the perforated plate 5,—the latter is removed by means of the handles 7 and disposed upon the shoulder 10 within the vessel 9. Vessel 9 may at convenience of operator be deposited on top of urn to keep its contents hot, or be set on urn table. The perforated plate 5 with the coffee bag 6 therein is removed as aforesaid for two reasons. In the first place the strength of the fluid when approximately two thirds of the water has passed through the bag 6 is about half again as strong as desired. Thus, plate 5 with bag 6 may be said to have been removed for economy purposes. In the second place,—if the level of the liquid is permitted to go above the plate 5 there will be extracted from the coffee in the bag 6 its undesirable astringent and rigid attributes; also the resultant steaming which is incidental to boiling will cause the liquid to lose its aromatic properties.

The drippings from the perforated plate 5 into the vessel 9 are poured into the urn 1 and subsequently the last third part of the water is poured into the urn. The resultant liquid in the urn chamber may be stirred or the liquid may be drawn off and poured in through the top of the urn so as to make the contents of the urn of uniform strength.

From the foregoing description, taken in connection with the accompanying drawings it is believed that the following advantageous features of my invention will be readily understood and appreciated by those skilled in the art: (1) great expedience in brewing large quantities of coffee; (2) increased economy in that pulverized coffee is made available for use and yields to action of hot water to a far greater extent than coarse ground coffee; (3) saving of time over old method in that boiling, steaming and repouring to secure full extraction from the grounds is unnecessary; (4) increased sanitation; (5) saving of time and simplification of the process to the extent that a relatively inexperienced person may produce a beverage of consistently high quality.

Having thus described my invention, what I claim as new and desire to secure by Letters Patent is:

1. In a coffee urn, an annulus of smaller diameter than the urn chamber and spaced from the walls thereof, offset depending legs carried by said annulus and flatly engaging the walls of the chamber to space the annulus therefrom, the lower ends of said legs engaging the bottom of the chamber to maintain the annulus at a predetermined height, a perforated plate removably supported upon said annulus, said plate having a marginal upwardly and outwardly inclined circumferential flange engaging the chamber wall to act as a seal and divert liquid from the chamber wall onto the plate, said flange serving to confine a coffee bag to entirely cover said plate to provide a uniform layer of coffee at all points thereon, upwardly extending handles carried by said plate flange and secured to the inner surface thereof, and said handles extending to a point adjacent the top of the urn and contacting with the side walls of the urn chamber.

2. The combination set forth in claim 1,—and said handles being relatively resilient and having inturned hooks at their upper ends.

3. The combination set forth in claim 1,—and said legs being relatively resilient to frictionally engage the urn-chamber wall whereby to tend to hold the annulus in place and against shifting.

4. In a coffee urn, an upstanding support positionable therein, a perforated plate removably positionable upon said support, said plate having a marginal upwardly and outwardly extending circumferential flange engaging the inner wall of said urn to act as a seal and divert liquid on to said plate, a coffee bag positionable upon said perforated plate, said flange engaging said bag to confine the sides thereof whereby a uniform layer of coffee may be provided upon said plate and confined by said bag and flange, and said plate having means whereby it can be inserted or removed from said urn.

5. The combination set forth in claim 4, and said support having means engaging the inner wall of said urn whereby to prevent transverse shifting of the support within the urn.

In testimony whereof I affix my signature.

KARL LEVI.